Patented Apr. 21, 1931

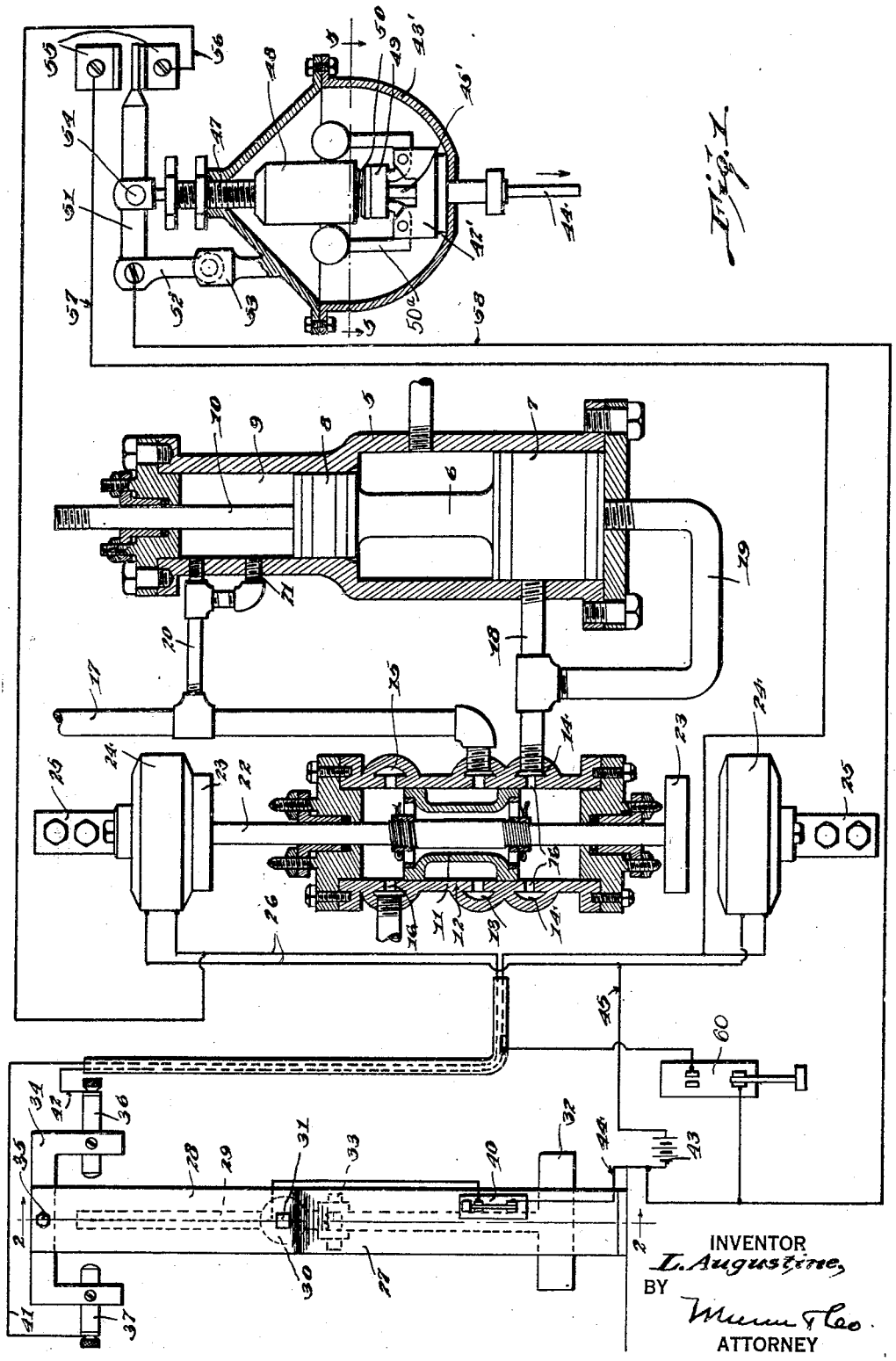

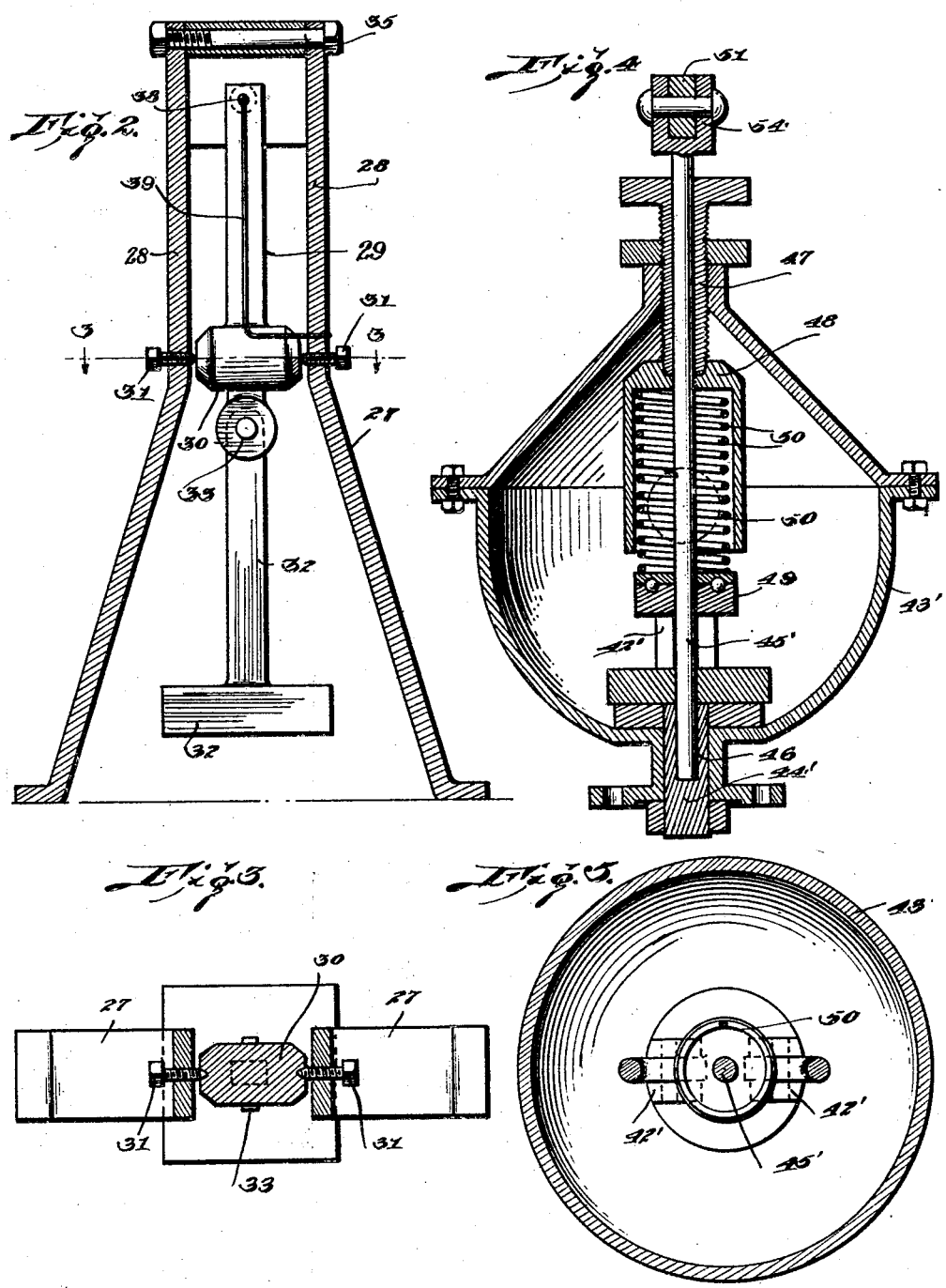

1,802,305

UNITED STATES PATENT OFFICE

LOUIS AUGUSTINE, OF BALTIMORE, MARYLAND

AUTOMATIC CONTROL FOR MARINE ENGINES

Application filed July 31, 1929. Serial No. 382,571.

My invention relates to automatic control mechanism for marine engines and an object of the same is to provide a mechanism of this character whereby the operation of the engine is controlled incident to the pitching of the ship so that when the ship propeller comes out of the water it will not rotate and when the ship rights itself the engine will be permitted to operate to again drive the propeller.

Further the invention provides an automatic control for marine engines which embodies a pressure operated piston connected with the engine control valve, an electrically actuated valve for controlling the operating pressure for the piston and a circuit closer which is responsive to the ship's movement fore and aft.

Another object of the invention resides in the provision of a governor controlled circuit closer which is operable to prevent the operation of the engine in the event of overspeeding of the latter.

With the preceding and other objects and advantages in mind, the invention consists in the novel combination of elements, constructions and arrangements of parts and operations to be hereinafter more fully described, claimed and illustrated in the accompanying drawings, wherein:

Fig. 1 is a plan view of the invention, parts being shown in section;

Fig. 2 is a vertical section taken on the line 2—2 of Fig. 1;

Fig. 3 is a horizontal section on line 3—3 of Fig. 2;

Fig. 4 is a vertical sectional view of the governor actuated circuit closer embodied in the invention; and Fig. 5 is a horizontal section taken on line 5—5 of Fig. 1.

Referring to the invention in detail a vertically disposed pressure cylinder 5 is provided in which a piston 6 having a large head 7 and a small head 8 is provided. The piston 8 operates in the reduced upper end 9 of the cylinder and attached thereto is a piston rod 10 to be connected with the engine control valve, not shown, in any conventional manner.

For the purpose of controlling the movement of the piston 6 a hollow piston valve 11 is provided and is reciprocable in a vertically disposed cylinder 12 extending parallel to the cylinder 5. A pair of non-communicating convex passages 13 and 14 are formed on the cylinder 12 adjacent its lower end while a third chamber 15 is formed on the cylinder at its upper end. Communication is established between the interior of the cylinder and the passageways 13, 14 and 15 by radial ports 16 formed in the walls of the cylinder.

A main pressure line 17 leading from the marine engine or other suitable source communicates with the passageway 13. A branch conduit 18 extends from the passageway 14 to one side of the pressure cylinder adjacent its lower end and leading from this conduit 18 is a U-shaped by-pass 19 having one end opening into the lower end of the pressure cylinder. A branch pipe 20 leads from the main supply pipe 17 and communicates with the upper end of the pressure cylinder. Leading from the upper end of the pressure cylinder slightly below the branch pipe 20 is a by-pass 21 which is closed by the piston head 8 when pressure is admitted against the piston head 7. In order to actuate the sliding piston valve 11 it is fixed to a rod 22 passing centrally through the valve and ends of the cylinder 12. A circular armature 23 is fixed to each end of the rod 22 and supported adjacent each of these armatures is an electromagnet coil 24, or solenoid, the latter being supported against one side of the ship by brackets 25. Electrical conductors 26 connect the coils in series.

A switch is provided for completing electric circuit to either of the coils comprising a vertical standard having divergent legs 27 which are anchored to the floor of the ship and parallel upper portions 28. A normally vertically disposed contact arm 29 is arranged between the parallel portions 28 and is formed with a hub 30 which is supported for movement about a horizontal axis on bearing screws 31. A pendulum or counter weight 32 is fixed to the under side of the hub 30 to normally support the arm 29 in a vertical position. The hub 30 is prevented from binding on the screws 31 when the ship rocks laterally, by a horizontal axis 33 extending at right angles to the screws 31. An inverted U-shaped member 34 is held between the upper end of the parallel portions 28 by a transverse bolt 35. As disclosed in Fig. 1 the parallel legs of the U-shaped member 34 are disposed upon opposite sides of the free end of the arm 29 and carry contacts 36 and 37 which are insulated from the member 34.

The contact arm 29 is provided with a contact element 38 at its upper end having electrical connection with one end of a conductor 39, the latter extending longitudinally of the arm to a cut out switch 40 supported on one side of the standard.

A conductor 41 extends from the contact 37 to one of the conductors 26 for the electromagnet coil and a second conductor 42 extends from the contact 36 to the other conductor 26. Electrical energy is supplied to the coils or solenoids 24 from any suitable source 43. One terminal of the power source 43 is connected with the cut out switch 40 by a wire 44 while a wire 45 extends from the other terminal of the power source to one of the conductors 26.

From the description thus far given it follows that the upper coil 24 is normally energized to hold the upper armature 23 against the same and thereby hold the D valve 11 in a position where the ports of the passages 13 and 14 do not communicate. Should the aft end of the ship rise out of the water the standard will tilt forwardly and engage its contact 36 with the contact 38. Thus an electrical circuit is completed through the conductor 42, one conductor 26, through the lower coil 24 to the other conductor 26, through conductor 45, power source 43 and conductors 44 and 39. Incident to the completion of this circuit the lower armature 23 is drawn downwardly to shift the piston valve to the lower end of the cylinder 12. Pressure from the pipe 17 passes through the cylinder 12 and enters the pressure cylinder by way of the by pass 19. By reason of the piston head 7 being of a greater area than the piston head 8 the pressure in the upper end of the pressure cylinder is overcome and the piston 6 shifted longitudinally to close the control valve of the engine thereby stopping the latter and the rotation of the propeller connected therewith. As the ship rights itself the contact 37 engages the contact 38 to complete an electrical circuit to the upper coil 24 which attracts the upper armature 23 to move the D valve to normal position. As the piston valve moves to normal position pressure confined in the pressure cylinder between the piston head 8 and lower cylinder head exhausts into the cylinder 12 through the port of the passage way 14, passes through the passage way in the piston valve and exhausts from the cylinder through the passage way 15. Pressure confined in the upper end of the pressure cylinder is now operative to force the piston head 8 to normal position thereby opening the control valve of the engine.

The invention also provides means for operating the piston 6 by the speed of the engine so that the latter will be stopped in the event of overspeeding at any time. For this purpose a fly ball governor 42′ contained in a housing 43′ is associated with the engine shaft 44′. A longitudinally shiftable stem 45′ extends centrally through the casing with one end slidable in a bore 46 in the shaft 44′ and its outer end slidable through an adjustable bushing 47 mounted in the outer end of the casing. A cylindrical housing 48 is slidably mounted on the stem 45′ and is adjustable longitudinally by the bushing 47 whose lower end bears against the upper end of this housing. A collar 49 is fixed to the inner end of the stem adjacent the inner end of the cylindrical housing. An expansible coil spring 50 is confined within the cylindrical housing and has one end position against the collar 49. As disclosed in Fig. 1 the weighted arm 50ª of the governor engages the collar 49 so that the power will be shifted against the tension of the spring 50 and correspondingly shift the stem 45′ when the shaft 44′ overspeeds.

A movable contact arm 51 extends at right angles to the stem 45′ exteriorly of the casing 43′. One end of this contact arm is pivotally connected with a link 52 which in turn is pivoted to a standard 53 formed on one side of the casing. In order to move the contact arm incident to the shifting of the stem 45′ the other end of the stem is pivotally connected with the contact arm intermediate its ends as at 54.

Arranged in advance of the free end of the contact arm 51 is a pair of spaced fixed contacts 55 against one of which the movable contact normally rests. The contact 55 normally engaged by the contact arm 51 is electrically connected with one of the conductors 26 by a conductor 56. A conductor 57 leads from the other contact 55 to the same conductor 26 at a point adjacent the lower solenoid 24. A conductor 58 is connected with the contact arm 51 and is connected with one side of the battery on the conductor 44. Thus a circuit is normally completed to the upper coil 24. When the contact arm 51 is moved against the other fixed contact 55 by the governor a circuit is completed to the lower coil 24 to attract its armature 23 and establish communication between the cylinder 12 and the pressure cylinder in the same manner as above stated in connection with the operation of the contact arm 29.

For the purpose of manually stopping the engine from a remote point a normally disengaged switch 60 is arranged in the circuit.

While I have illustrated one switch in the circuit it is desirable to have them at predetermined points in the ship.

What is claimed is:

1. In an automatic control for marine engines, a pressure cylinder, a control valve actuating piston arranged in the pressure cylinder, a cylinder having communication with the pressure cylinder, means for supplying fluid pressure to the cylinder, a slide valve in the cylinder, a stem attached thereto and extending from opposite ends of the cylinder, an armature fixed to each end of the stem, and an electro-magnetic coil arranged opposite each armature, and a circuit closer operable by the ship's movement fore and aft to complete electrical circuit to the coils to shift the valve to a position to permit fluid pressure to enter the pressure cylinder or to move the valve to a position to sever communication between the cylinder and pressure cylinder.

2. In an automatic control for marine engines, a pressure cylinder, a control valve actuating piston arranged in the pressure cylinder, a cylinder having communication with the pressure cylinder, means for supplying fluid pressure to the cylinder, a slide valve in the cylinder, a stem attached thereto and extending from opposite ends of the cylinder, an armature fixed to each end of the stem, an electro-magnetic coil arranged opposite each armature and a governor actuated circuit closer responsive to the speed of the engine shaft and operative to complete an electrical circuit to the coils to shift the valve to a position to permit fluid pressure to enter the pressure cylinder or to move the valve to a position to sever communication between the cylinder and pressure cylinder.

LOUIS AUGUSTINE.